H. BILHARZ.
Cornstalk Cutter.

No. 66,287.

Patented July 2, 1867.

Witnesses

Henry Bilharz

United States Patent Office.

HENRY BILHARZ, OF SENECA, ILLINOIS.

Letters Patent No. 66,287, dated July 2, 1867.

IMPROVEMENT IN MACHINE FOR CUTTING CORN STALKS IN THE FIELD.

*The Schedule referred to in these Letters Patent and making part of the same.*

TO ALL WHOM IT MAY CONCERN:

Be it known that I, H. BILHARZ, of Seneca, in the county of Lasalle, in the State of Illinois, have invented a new and improved Machine for Cutting Corn Stalks in the Field; and I do hereby declare that the following is a full and exact description thereof, reference being had to the accompanying drawings, and to the letters of reference marked thereon.

My invention consists in a machine drawn by horse-power or equivalent over a field of corn, and so arranged that an attendant, standing on the said machine, can, by acting with one hand on a reciprocating lever, cut off two rows of corn stalks at one time of passing over the field.

My invention further consists in a novel arrangement of a lever and hinged shelve boards, by means of which the corn stalks that have by the operation of cutting accumulated on the machine can be discharged in a bundle right and left of the machine, said lever being operated upon by the same attendant by means of pulling a rope.

Figure 1:
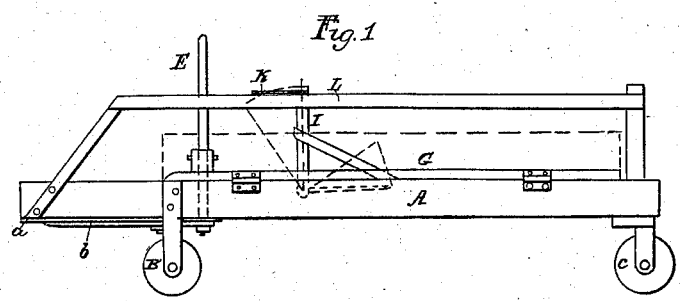

Figure 1 in the drawing is a vertical plan.

Figure 2:
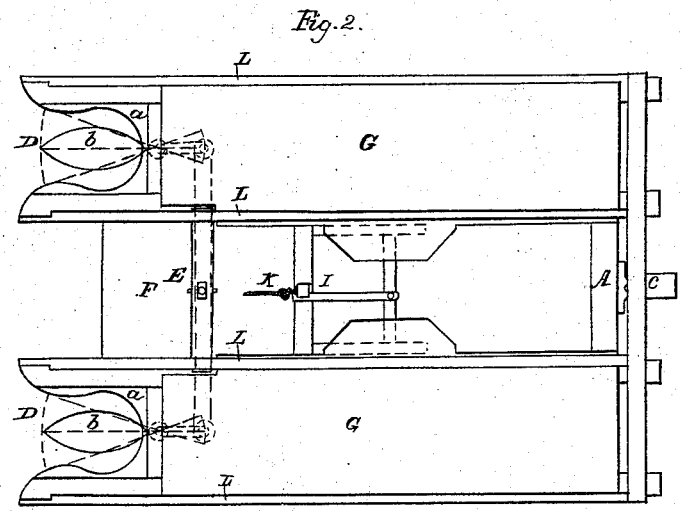

Figure 2 is a horizontal plan.

The lines in red indicate the direction and extent of motion of the knives $b\ b$ of the lever I, and of the shelf boards G G.

I construct a timber frame, A, supported on two side-wheels B B, and on one caster-wheel C. At the forward end of said frame A I attach two sets of cutters D D, each of them consisting of a cast-iron or steel plate, $a$, and a double-edged knife, $b$, which knife $b$ has a vibrating motion given it by means of a lever, E, which is moved by an attendant standing on the platform F. The corn stalks which are thus cut drop on the hinged shelves G G, from which they are discharged in quantities to suit, by lifting the inner side of both shelves G G by means of a lever, I, which is effected by the attendant pulling a rope, K, fastened to the lever I. The machine is further provided with a railing, L, for the purpose of guiding the corn stalks in their fall after being cut, so as to form a pile or bundle upon the shelve boards G G.

What I claim as my invention and desire to secure by Letters Patent, is—

1. The peculiar construction of the cutting apparatus D D, consisting of the plates $a\ a$, and the double-edged knives $b\ b$, substantially and for the purpose described in the foregoing specification.

2. I claim the lever E in combination with the knives $b\ b$, and the plates $a\ a$, substantially and for the purpose described.

3. I claim the lever I in combination with the hinged shelves G G, substantially and for the purpose described.

4. I claim the railing L in combination with the cutters D D, the lever I, and the shelf boards G G, substantially and for the purpose described.

HENRY BILHARZ.

Witnesses:
 E. ROSE,
 HENRY HARTMANN.